US012760993B1

(12) United States Patent
Frits, Jr. et al.

(10) Patent No.: US 12,760,993 B1
(45) Date of Patent: Oct. 13, 2026

(54) EJECTABLE STRONGBACK FOR THE ATTACHMENT OF ROCKET BOOSTERS TO AIR-LAUNCHED WEAPONS

(71) Applicant: Raytheon Company, Arlington, VA (US)

(72) Inventors: Andrew P. Frits, Jr., Tucson, AZ (US); Neil J. Swanson, Jr., Tucson, AZ (US); Lance Markovchick, Tucson, AZ (US)

(73) Assignee: Raytheon Company, Arlington, VA (US)

( * ) Notice: Subject to any disclaimer, the term of this patent is extended or adjusted under 35 U.S.C. 154(b) by 0 days.

(21) Appl. No.: 19/327,514

(22) Filed: Sep. 12, 2025

(51) Int. Cl.
*F41F 3/052* (2006.01)
*B64C 39/12* (2006.01)
*B64D 47/00* (2006.01)

(52) U.S. Cl.
CPC .............. *F41F 3/052* (2013.01); *B64C 39/12* (2013.01); *B64D 47/00* (2013.01)

(58) Field of Classification Search
CPC ........... F41F 3/052; B64C 39/12; B64D 47/00
USPC ........................................................ 89/1.813
See application file for complete search history.

(56) References Cited

U.S. PATENT DOCUMENTS 5,141,175 A 8/1992 Harris
5,402,728 A 4/1995 Garner
5,615,846 A 4/1997 Shmoldas et al.
6,152,041 A 11/2000 Harris et al.
6,186,442 B1 2/2001 Bittle
6,761,331 B2 7/2004 Eisentraut et al.
6,880,780 B1 4/2005 Perry et al.
6,905,093 B2 6/2005 Dryer et al.
7,262,395 B2 8/2007 Bilyk et al.
8,222,541 B2 7/2012 Vander et al.
(Continued)

FOREIGN PATENT DOCUMENTS

WO 2008010226 1/2008
WO 2016122430 8/2016
WO WO-2024241026 A1 * 11/2024 ............ B64U 80/86

OTHER PUBLICATIONS

"U.S. Appl. No. 19/327,549, Notice of Allowance mailed Apr. 30, 2026", 10 pgs.

(Continued)

*Primary Examiner* — Samir Abdosh
(74) *Attorney, Agent, or Firm* — Schwegman Lundberg & Woessner, P.A.

(57) ABSTRACT

An ejectable strongback assembly for coupling a delivery vehicle to a payload is provided. The assembly includes a first side configured to couple with the payload, and a second side with first and second canards positioned at opposite ends. The canards generate lift forces in aerodynamic fluid to direct the strongback away from the payload after separation. The assembly further includes first and second interfaces extending from the first side to engage with the payload, at least one separation mechanism to provide initial separation, and electronics configured to send a control signal to the interfaces. The system enables secure attachment and controlled, low-shock release of the strongback and booster, minimizing residual hardware and aerodynamic interference after launch. The assembly can allow a lug-restrained and released object to become a rocket motor-boosted object.

20 Claims, 13 Drawing Sheets

(56) References Cited

U.S. PATENT DOCUMENTS

| | | | | |
|---|---|---|---|---|
| 9,006,628 | B2 | 4/2015 | Roemerman et al. | |
| 9,012,825 | B2 | 4/2015 | Plumer et al. | |
| 9,745,063 | B2 | 8/2017 | London et al. | |
| 12,286,224 | B2 * | 4/2025 | Yates | B64U 20/70 |
| 2006/0027083 | A1 | 2/2006 | Lee et al. | |
| 2007/0018033 | A1 | 1/2007 | Fanucci et al. | |
| 2008/0035786 | A1 | 2/2008 | Bilyk et al. | |
| 2012/0074256 | A1 | 3/2012 | Pietrzak et al. | |
| 2014/0021289 | A1 | 1/2014 | Bugge et al. | |
| 2020/0393223 | A1 | 12/2020 | Travis | |
| 2022/0363386 | A1 * | 11/2022 | Treadway | B64D 1/04 |
| 2026/0048842 | A1 * | 2/2026 | Treadway | B64D 1/04 |

OTHER PUBLICATIONS

"U.S. Appl. No. 19/327,478, Non Final Office Action mailed Jun. 17, 2026", 16 pgs.
"U.S. Appl. No. 19/327,478, Response filed Jul. 31, 2026 to Non Final Office Action mailed Jun. 17, 2026", 18 pgs.
"U.S. Appl. No. 19/327,549, Corrected Notice of Allowability mailed Aug. 7, 2026", 2 pgs.

* cited by examiner

EJECTABLE STRONGBACK FOR THE ATTACHMENT OF ROCKET BOOSTERS TO AIR-LAUNCHED WEAPONS

GOVERNMENT RIGHTS

Portions of this disclosure were government funded. Therefore, the U.S. government may have certain rights.

TECHNICAL FIELD

Examples relate to an interface between a delivery vehicle and a payload and more specifically to a strongback assembly configured to passively separate from a payload.

BACKGROUND

In modern aerospace and defense applications, a wide range of payloads—from guided munitions and unmanned vehicles to submersible systems—are required to be reliably secured to their delivery vehicle during handling, transport, and launch preparations. As mission requirements evolve to include rapid reconfiguration and mixed operating domains, the demand for versatile, modular coupling solutions becomes increasingly evident. Systems that facilitate both firm retention and controlled release without extensive platform modification are particularly beneficial across air-, sea-, and land-based deployment scenarios.

Across these deployment environments, a primary objective is to enhance operational performance by reducing the mass and aerodynamic or hydrodynamic signature of residual hardware after separation. Designers aim to transition payload-support interfaces from a high-strength, retention-focused configuration to a low-interference state once the payload has departed its host platform. Accomplishing this requires mechanisms that can safely carry launch or handling loads, then reliably disengage and clear the flight path of the payload without adding cumbersome jettisoned structures. Moreover, designs of these mechanisms can allow for repurposing of air-launched vehicles into ground-launched vehicles with minimal changes to the air-launched vehicles.

SUMMARY

Interface hardware-such as mechanical lugs, hook-and-slot arrangements, or bolted fixtures-provides robust attachment performance during pre-launch phases but often remains affixed beyond its functional need. This lingering presence contributes to excess weight and drag, which can negatively impact range, speed, and fuel efficiency. Numerous existing systems depend on manual release procedures or high-shock separation devices that introduce significant mechanical impulse to the payload, potentially disrupting the initial trajectory or causing structural strain. Resolving this while maintaining attachment reliability continues to be a challenge in the field.

A more nuanced challenge lies in orchestrating a smooth, shock-mitigated release that imposes minimal residual resistance and avoids imparting destabilizing forces on the payload. Mechanical or pyrotechnic release methods may generate abrupt impulses or leave small fragments that interfere with aerodynamic flow. They may also require complex timing and sequencing to ensure synchronous disengagement across multiple attachment points. Improved decoupling approaches are necessary, combining low-impulse release elements with passive separation aids, enabling the payload and associated support hardware to part ways predictably, safely, and with minimal impact on ongoing flight dynamics.

The disclosure provides a strongback assembly configured to couple with a payload and a delivery vehicle that addresses the problems noted above. The strongback assembly includes a pair of canard sets positioned respectively at opposite ends of a top side of the strongback assembly. After the strongback assembly initially separates from the payload, the canards can generate lift forces in an aerodynamic flow about the strongback assembly to direct the strongback assembly away from the payload to further separate the strongback assembly from the payload.

The strongback assembly has first and second interfaces that extend from a bottom surface of the strongback assembly opposite the top surface. The first and second interfaces engage with a side of the payload and function to couple the strongback assembly with the payload. In addition, the strongback assembly has a separation mechanism that extends from within the strongback assembly and from the bottom side of the strongback assembly. The separation mechanism functions to separate the housing from the payload and provide a gap between the payload and the housing during an initial separation. The gap can allow for the aerodynamic fluid about the strongback assembly and the canards thereby allowing the canards to generate lift forces to provide further separation between the strongback assembly and the payload.

The first and second interfaces can comprise low-shock explosive bolts that, in conjunction with a separation mechanism, provide an initial separation distance between the assembly and the payload by severing the assembly from the payload. In examples, the first and second interfaces can interface with lugs at the payload. The first and second interfaces can receive an electrical impulse, which can cause firing of the explosive bolts and separation of the strongback assembly from the payload. Alternatively, instead of engaging with lugs, the first and second interfaces can interface directly with the payload. In particular, the first and second interfaces can interface with the payload where lugs would typically be located at the payload.

The separation mechanism can be a compression spring that is in a compressed state when the strongback assembly is coupled with the payload. When the first and second interfaces are disengaged, the compression spring can apply a force against the payload, which can separate the housing from the payload. The initial separation caused by the separation mechanism can create the gap.

Safe stage separation can occur when a strongback rocket motor assembly and the payload delivery vehicle assembly separate without exceeding the design limits of payload delivery vehicle and without the strongback rocket motor assembly damaging or contact with the payload delivery vehicle. Successful stage separation balances two issues; the kinematic clearance of the stages, and control capture of the payload delivery vehicle. Kinematic clearance is achieved by providing a sufficiently large delta velocity at the moment of separation. The delta velocity can be achieved by either, or in combination, through a mechanical system (e.g. sprints, pistons) or through aerodynamic forces. A problem occurs when the strongback rocket motor assembly separates from the payload delivery vehicle and air flow impacts the rocket motor, which can rotate the strongback rocket motor assembly toward and into the payload delivery vehicle. Under these conditions, a deployable canard on the strongback generates a lift force that aids separation by adding additional delta velocity and delta rate for safe and successful separation.

The disclosure includes variations of the strongback assembly wherein the structural and functional features are similarly arranged, and the payload is selected from armament and unmanned vehicles. These and other features of the disclosure are described in further detail in the accompanying description and drawings.

DETAILED DESCRIPTION

The following description and the drawings sufficiently illustrate teachings to enable those skilled in the art to practice them. Other embodiments may incorporate structural, logical, electrical, process, and other changes. Portions and features of some examples may be included in, or substituted for, those of other examples. Teachings set forth in the claims encompass all available equivalents of those claims.

An ejectable strongback assembly configured to couple with a payload and a delivery vehicle is described. The strongback assembly includes a pair of canard sets positioned respectively at opposite ends of a top side of the strongback assembly. After the strongback assembly initially separates from the payload, the canards can generate lift forces in a aerodynamic fluid about the strongback assembly to direct the strongback assembly away from the payload to further separate the strongback assembly from the payload.

The ejectable strongback assembly has first and second interfaces that extend from a bottom surface of the strongback assembly opposite the top surface. The first and second interfaces engage with a side of the payload and function to couple the strongback assembly with the payload. In addition, the strongback assembly has a separation mechanism that extends from within the strongback assembly and from the bottom side of the strongback assembly. The separation mechanism functions to separate the housing from the payload and provide a gap between the payload and the housing during an initial separation. The gap can allow for the aerodynamic fluid about the strongback assembly and the canards thereby allowing the canards to generate lift forces to provide further separation between the strongback assembly and the payload.

The pair of canards can be installed with an angle of incidence relative to the ejectable strongback assembly and can generate lift as soon as the canards are deployed. The canard span can be sufficient for the lifting surface to reside outside the low velocity flow adjacent to a body of the ejectable strongback assembly and can be effective upon deployment. Once the ejectable strongback assembly is released this aerodynamic pre-load combined with the action of the separation mechanisms can impart a delta velocity and a delta rate to safely separate the ejectable strongback assembly from the delivery vehicle. The delta velocity and rate can limit rotation into the payload upon separation. The canards will be effective even with a rolling, pitching, or yawing deliver vehicle.

Figure 1:
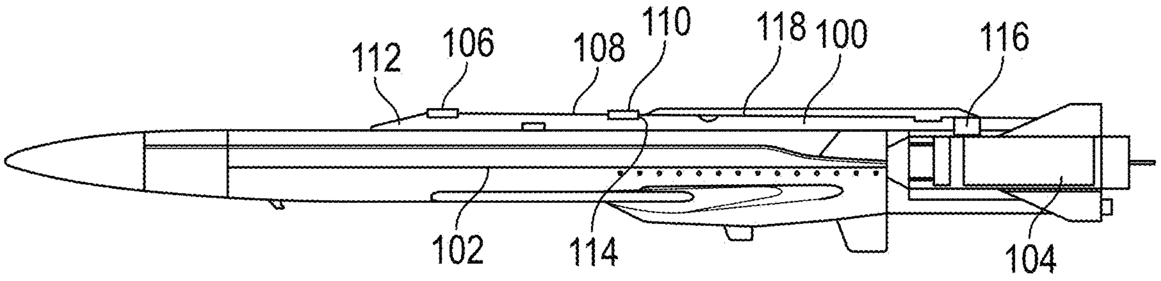
FIG. 1 illustrates an ejectable strongback assembly coupled to a payload.

Now making reference to FIG. 1, an ejectable strongback assembly 100 coupled with a payload 102 at a side 200 (FIG. 2) of the strongback assembly 100 is shown. The payload 102 may be any type of article including armament such as a missile, an unmanned vehicle, a payload having marine applications, such as an unmanned submersible, a torpedo, or any other type of article that is capable of being delivered via a delivery vehicle 104. The delivery vehicle 104 can provide propulsion for the strongback assembly 100 and the payload 102. In particular, the delivery vehicle 104 can propel the strongback assembly 100 and the payload 102 from a launch site. Examples of the delivery vehicle 104 can include a rocket or any other type of article capable of propelling the strongback assembly 100 and the payload 102.

Figure 2:
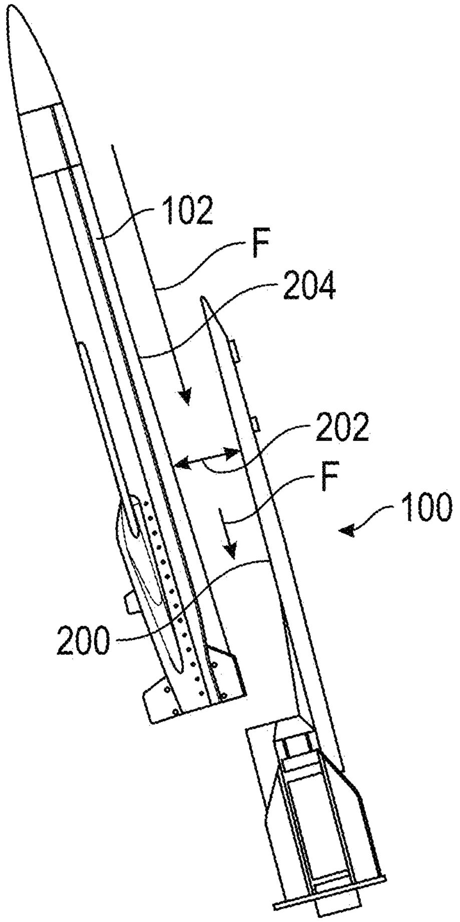
FIG. 2 illustrates an initial separation between the strongback assembly of FIG. 1 and the payload of FIG. 1.

The strongback assembly 100 can be configured to passively separate from the payload 102, as shown with reference to FIG. 2. Initially, the strongback assembly 100 can decouple from the payload 102 and have an initial separation from the payload 102. The initial separation can create a gap 202 between the strongback assembly side 200 and a side 204 of the payload 102. The gap 202 can allow for aerodynamic fluid F between the strongback assembly side 200 and the payload side 204.

In order to initially separate from the payload 102, the strongback assembly 100 can include a separation mechanism 300 (FIG. 3) that extends from the strongback assembly side 200. The separation mechanism 300 can abut the payload side 204, thereby engaging with the payload side 204. The separation mechanism 300 can be configured to impart a force M (FIG. 3) against the payload side 204 in order to separate the strongback assembly 100 from the payload 102.

Figure 3:
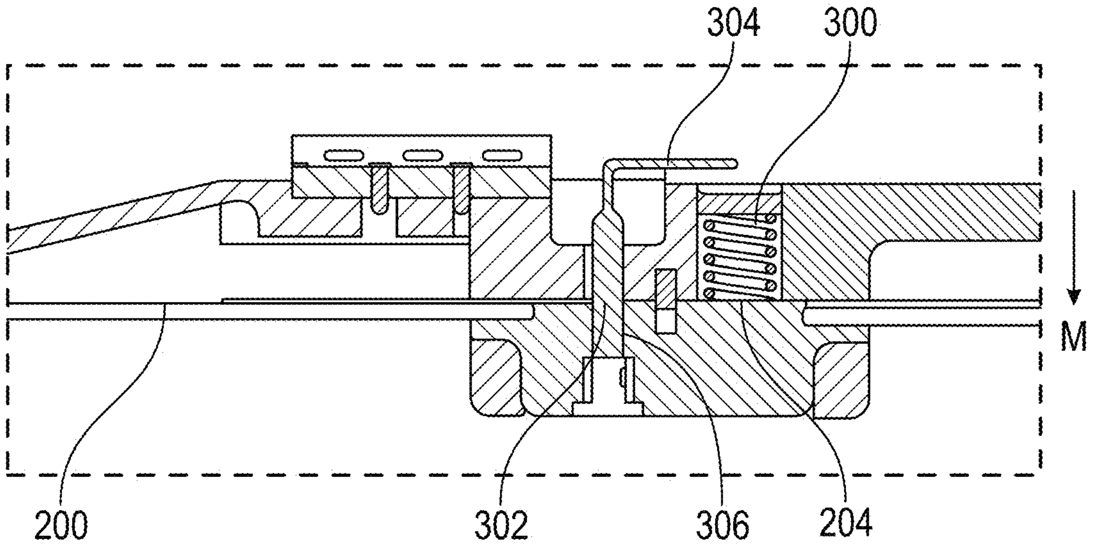
FIG. 3 is another view of the strongback assembly of FIG. 1 coupled with the payload of FIG. 1.
Figure 4:
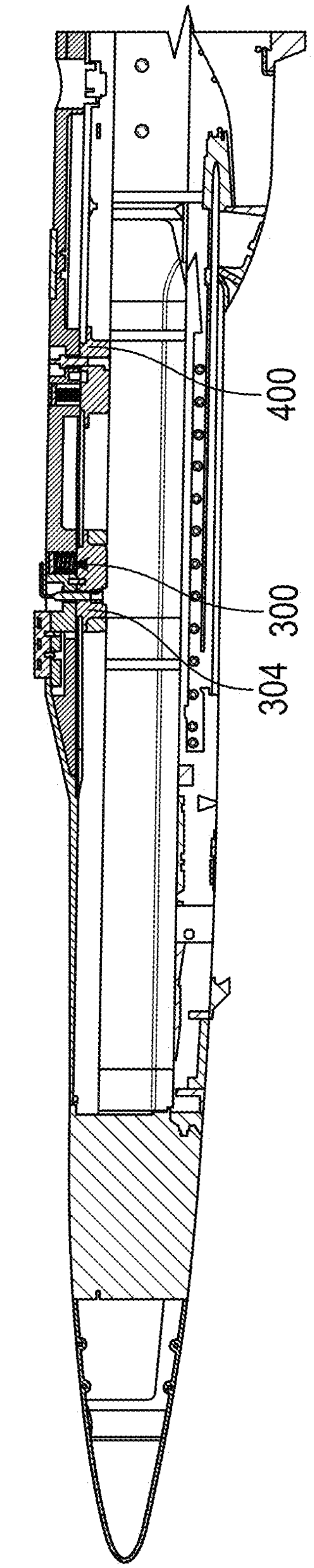
FIG. 4 is another view of the strongback assembly of FIG. 1 coupled to the payload of FIG. 1.

The separation mechanism 300 can be a compression spring as shown with reference to FIG. 3. In examples where the separation mechanism 300 is a compression spring, the separation mechanism 300 can be in a compressed state, thereby exerting the force M against the payload side 204 and the payload. In order to maintain the separation mechanism 300 in the compressed state and to couple the strongback assembly 100 with the payload 102, the strongback assembly 100 can include interfaces 302 and 400 (FIG. 4). The interfaces 302 and 400 can have the same configuration and the same functionality. Thus, discussion with regards to the interface 302 is also applicable to the interface 400, and vice versa.

Sticking with FIG. 3, the interface 302 can be disposed at the strongback assembly side 200 and extend from the strongback assembly side 200. The interface 302 can engage with the payload 102. A control signal 304, which can be an electronic pulse, can be provided to the interface 302, which can cause severing of the interface 302. In further examples, the interface 302 can be comprised of low-shock explosive bolts configured to impart minimal reactive force onto the payload 102. Upon activation, the minimal reactive force imparted by the interface 302 coupled with the force M imparted by the separation mechanism 300 can create the gap 202 between the strongback assembly 100 and the payload 102.

The interface 302 can be non-explosive where the interface 302 can be electrically actuated separation nuts or non-explosive separation nuts. The interface 302 can be a bolt that can be configured to sever with the application of an electrical signal. Here, the payload 102 can include payload cavities 306 and 402 that can be threaded to receive the interface 302. The interface 302 can include threads that are complementary to the payload cavities 306 and 402. Thus, the interface 302 can be threaded into the payload cavities 306 and 402. As will be discussed further below, the payload cavities 306 and 402 can correspond to threaded lug positions. The interface 302 can be a nichrome burn wire release nut, a split-spool initiator-based nut, a mechanical release nut with a locking sleeve and a rocker, or the like.

In examples, the payload 102 can include lugs 500 (FIG. 5), which can function as a strong portion of the payload 102, that can be used to facilitate coupling of the strongback assembly 100 with the payload 102. The lugs 500 can be disposed within cavities of the payload 102, such as the payload cavities 306 and 402, and can extend from the payload side 204.

Figure 6:
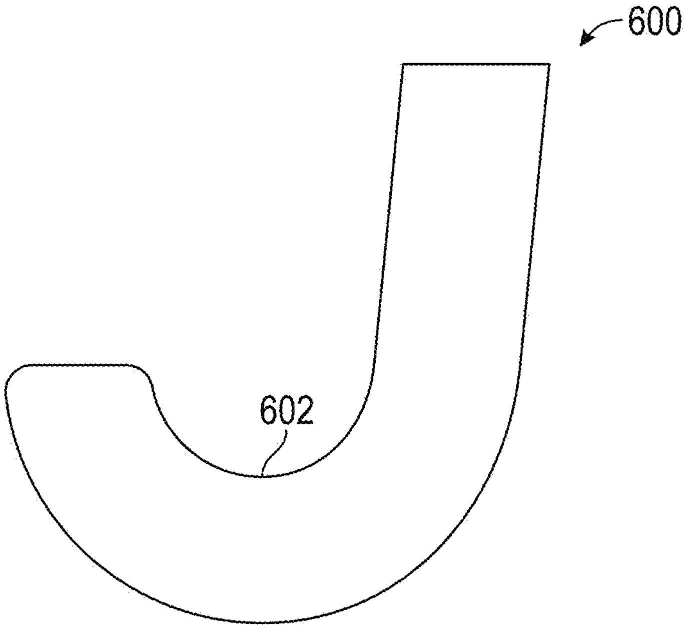
FIG. 6 shows a hook that can be used to couple the strongback assembly of FIG. 1 with the lug of FIG. 5.

The strongback assembly 100 can include interfaces 600 that can interface with the lugs 500, thereby coupling with the strongback assembly 100 with the payload 102. As shown with reference to FIG. 6, the interface 600 can include a hook 602, which can catch a loop 502 of the lug 500. When the interface hook 602 catches the lug loop 502, the strongback assembly 100 can couple with the payload 102. The interfaces 600 can have the same features and characteristics as described herein with respect to the interfaces 302 and 400.

Figure 5:
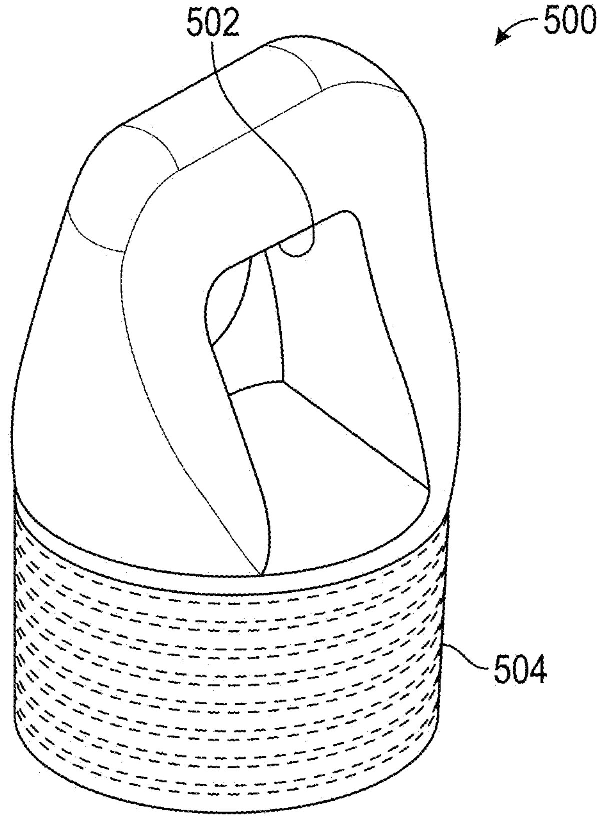
FIG. 5 illustrates a lug, including a threaded portion, a loop, and structural features for coupling with the strongback assembly.

As can be seen with reference to FIG. 5, the lugs 500 can include a threaded portion 504. As noted above, the payload cavities 306 and 402 can be threaded. The payload cavities 306 and 402 can correspond to a threaded lug position where the lugs 500 can couple with the payload 102 through threaded insertion into the payload cavities 306 and 402.

Returning attention to FIG. 1, the strongback assembly 100 can include a canard 106 disposed at a side 108 of the strongback assembly 100 opposite the strongback assembly side 200. In addition, the strongback assembly 100 can include a canard 110 disposed at the strongback assembly side 108. The canard 106 can be at an end 112 of the strongback assembly 100 while the canard 110 can be at an end 114 of the strongback assembly 100 that is opposite the strongback assembly end 112.

Figure 7:
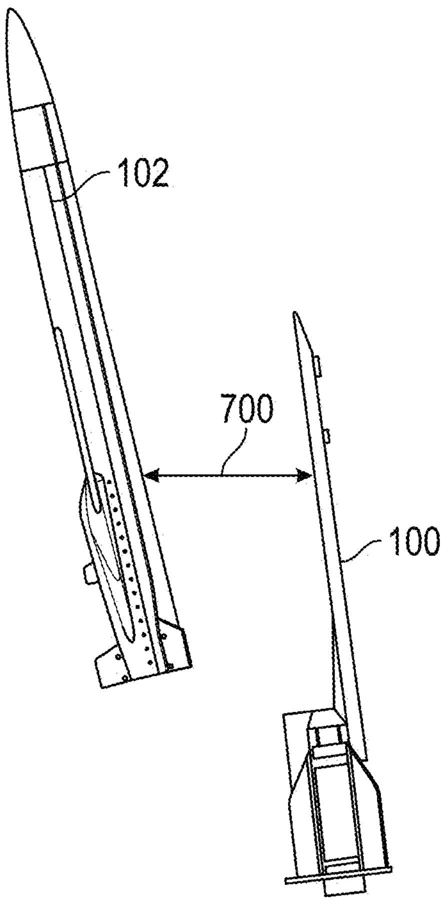
FIG. 7 illustrates further separation between the strongback assembly of FIG. 1 and the payload of FIG. 1 using canards that are coupled with the strongback assembly.

The canards 106 and 110 can be configured to passively separate the strongback assembly 100 from the payload 102. The canards 106 and 110 can be configured to generate lift in the aerodynamic fluid F about the strongback assembly 100 in order to direct the strongback assembly 100 away from the payload 102. More specifically, after the initial separation caused by the interfaces 302 and 400 along with the separation mechanism 300, lift forces generated by the canards 106 and 110 can direct the strongback assembly 100 further away from the payload 102, as shown with reference to FIG. 7, where a distance 700 is greater than the gap 202. By controlling the severing of the strongback assembly 100 from the payload 102 using the interfaces 302 and 400 and the separation mechanism 300 that impart minimal force on the payload 102 in conjunction with the passive separation made possible by the canards 106 and 110, the payload 102 can be protected during release from the strongback assembly 100.

The strongback assembly 100 can be configured to support the delivery vehicle 104 at the strongback assembly side 200. In particular, the strongback assembly 100 can include brackets, which can couple with the delivery 104, thereby coupling the delivery vehicle 104 with the strongback assembly 100. Moreover, fasteners can be used to couple the strongback assembly 100 with the delivery vehicle 104. Thus, the strongback assembly 100 can support the delivery vehicle 104.

As mentioned above, the control signal 304 can be sent to the interface 302 to initiate separation of the strongback assembly 100 from the payload 102. The strongback assembly 100 can include electronics 116 in electrical communication with the interfaces 302 and 400 and shown as electrical connection 118 in FIG. 1. The electronics 116 can send the control signal 304 via the electrical connection 118 to the interfaces 302 and 400, which can initiate separation of the strongback assembly 100 from the payload 102.

Figure 8A:
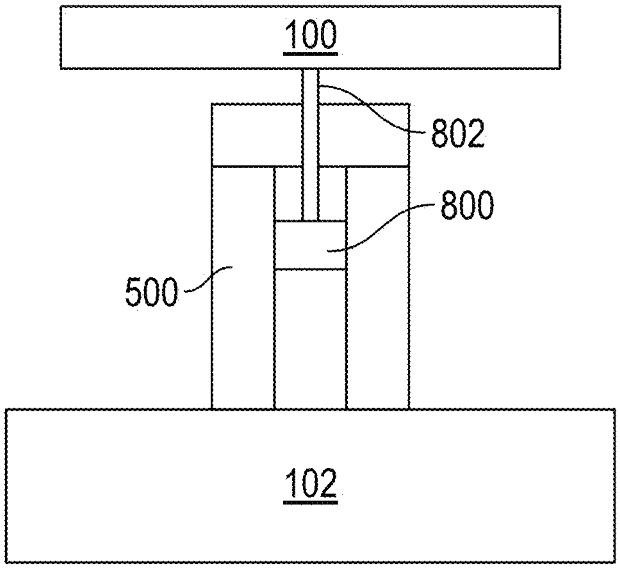
FIGS. 8A, 8B, 9, and 10 show an interface of the strongback system of FIG. 1 coupled to the payload of FIG. 1 via a holdback plate and launch lugs.
Figure 8B:
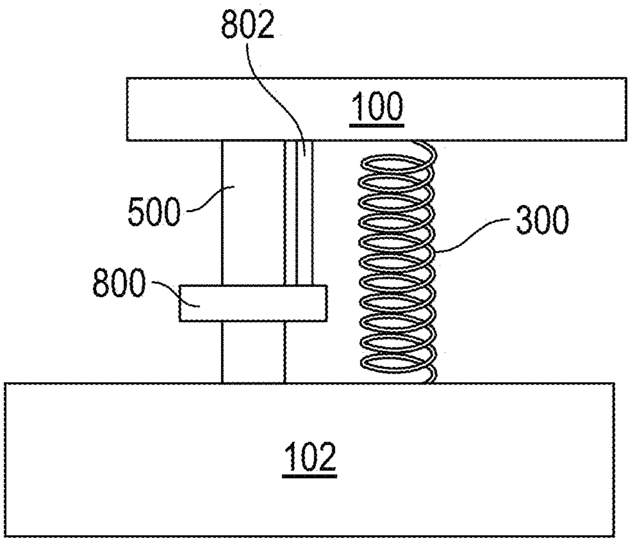
Figure 9:
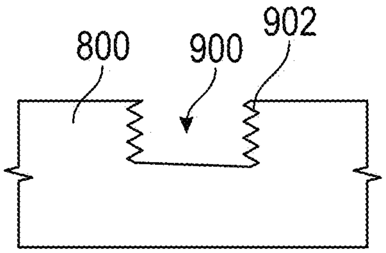
Figure 10:
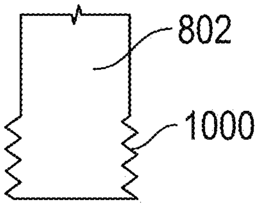

In addition to engaging with the lug 500 via the interface hook 602, a holdback plate 800 can be used to couple interfaces 802 with the payload 102, as shown with reference to FIG. 8A, which illustrates a front view of the lug 500 and the holdback plate 800 and FIG. 8B, which shows a side view of the lug 500 and the holdback plate 800. The holdback plate 800 can be rigidly coupled with the lug 500 using any type of process capable of rigidly coupling a first member with a second member. Examples include welding, forming the lug 500 and the holdback plate as a single unit during a manufacturing process, an adhesive, or the like.

The holdback plate 800 can include a cavity 900, which can receive the interface 802. The interface 802 can extend from the strongback assembly 100 in a manner similar to the interface 302 described herein. Furthermore, the interface 806 can have characteristics and functionality similar to the interface 302, as described herein. The cavity 900 can have threads 902, while the interface 802 can include threads 1000 that are complementary to the cavity threads 902. Thus, the interface 802 can threadingly engage with the holdback plate 800. The payload cavity 306 can have threads similar to the cavity threads 902 while the interfaces 302 and 400 can have threads similar to the interface threads 1000 such that the interfaces 302 and 400 can threadingly engage with the cavity 306.

Figure 11:
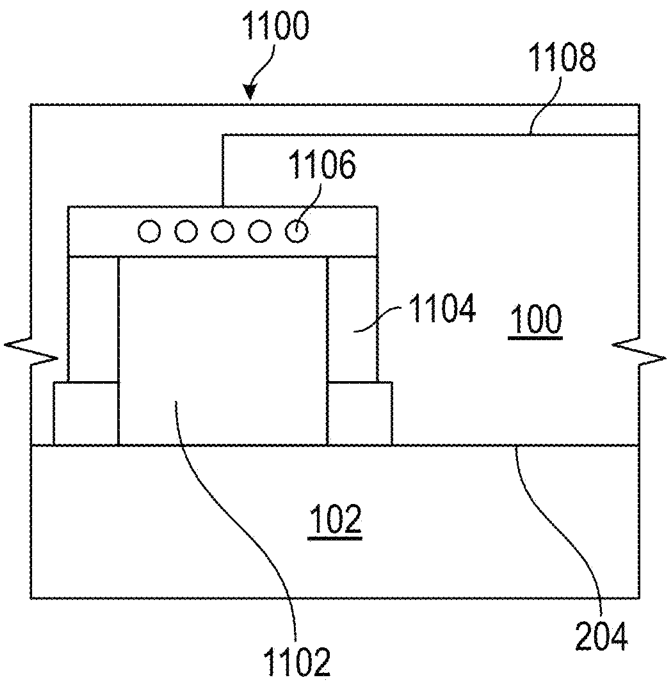
FIGS. 11 and 12 illustrate an assembly of a separation mechanism according to alternative examples.

As detailed above, a separation mechanism can provide initial separation when the strongback assembly 100 severs from the payload 102 to create the gap 202. In alternative examples, the strongback assembly 100 can have a separation mechanism 1100 that can include a piston 1102 disposed within a cylinder 1104, as shown with reference to FIG. 11. In addition, a combustible material 1106 is disposed within the cylinder 1104. The piston 1102 can abut the payload 102 and engage the payload side 204 when the piston 1102 is within the cylinder 1104 and in a withdrawn state. The piston 1102 can be in the withdrawn state when the strongback assembly 100 is coupled with the payload 102.

Figure 12:
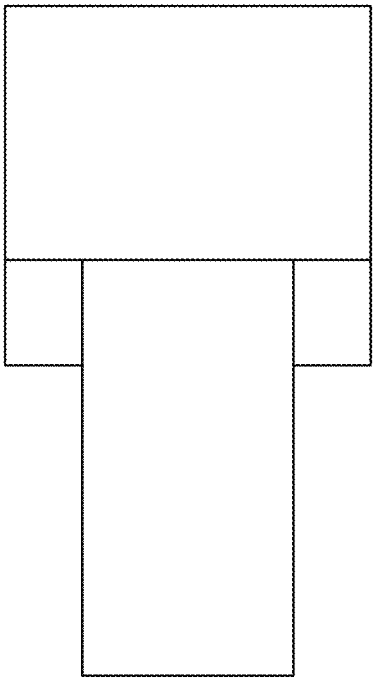

The electronics 116 can send a control signal 1108 via the electrical connection 118 to the separation mechanism 1100, which can cause ignition of the combustible material 1106. Combustion of the combustible material 1106 can move the piston 1102 from the position shown with reference to FIG. 11 to the position shown with respect to FIG. 12. When the piston 1102 moves to the position shown respect to FIG. 12, the strongback assembly 100 separates from the payload 102 and creates the gap 202.

In examples where the electronics 116 send the control signal 1108 to the separation mechanism 1100, the electronics 116 can send the control signal 1108 as part of a timing control initiated by the electronics 116. The timing control can relate to the activation of the interfaces 302 and 400 and the separation mechanism 1100. The timing control can be in a sequential manner where the electronics 116 first send the control signal 304 to the interfaces 302 and 400 to initiate severing. Then, the electronics 116 can send the control signal 1108 to the separation mechanism 1100 to initiate separation of the strongback assembly 100 from the payload 102, as discussed herein.

As noted above, the strongback assembly 100 can include canards 106 and 110. Now making reference to FIG. 13, the canard 106 is shown in a deployed configuration. It should be noted that the discussion herein with respect to the canard 106 can also apply to the canard 110. The canard 106 can include a longitudinal axis 1300. The canard longitudinal axis 1300 can be at an angle 1302 relative to a longitudinal axis 1304 of the strongback assembly 100 when the canard 106 is in the deployed configuration. The angle 1302 can be in a range from about 1° to about 90°. In the deployed configuration, the canard 106 can generate lift forces in the aerodynamic fluid F about the strongback assembly 100, thereby directing the strongback assembly 100 away from the payload 102.

Figure 14:
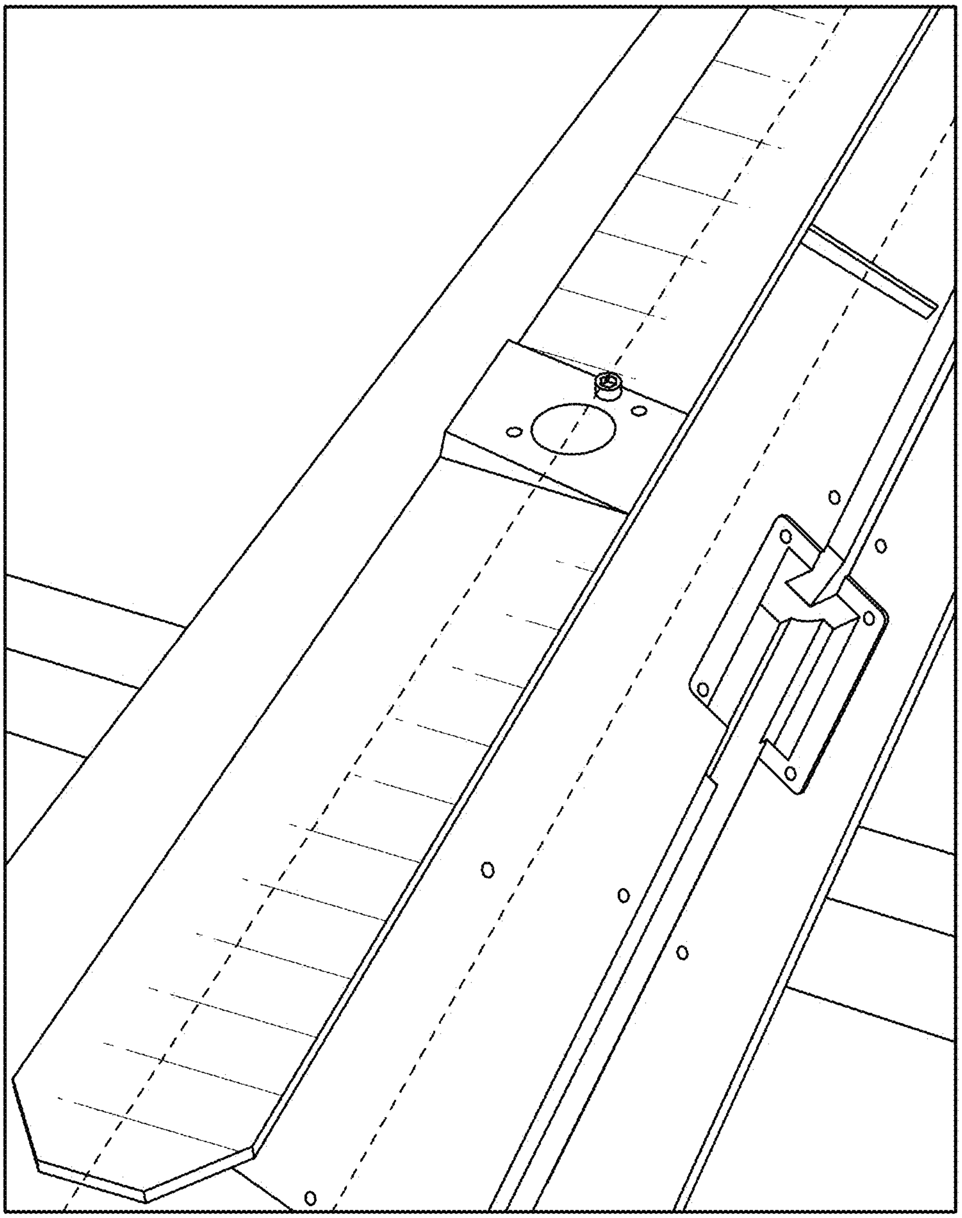
FIG. 14 shows a canard of the strongback assembly of FIG. 1 in a stowed configuration.

The canard 106 can also be in a stowed configuration, as shown with reference to FIG. 14. In the stowed configuration, the canard longitudinal axis 1300 can be aligned with the strongback assembly longitudinal axis 1304. In order to maintain the canard 106 in the stowed configuration and move the strongback assembly 100 into the deployed configuration, the strongback assembly 100 can include an assembly 1500, as shown with reference to FIG. 15.

Figure 15:
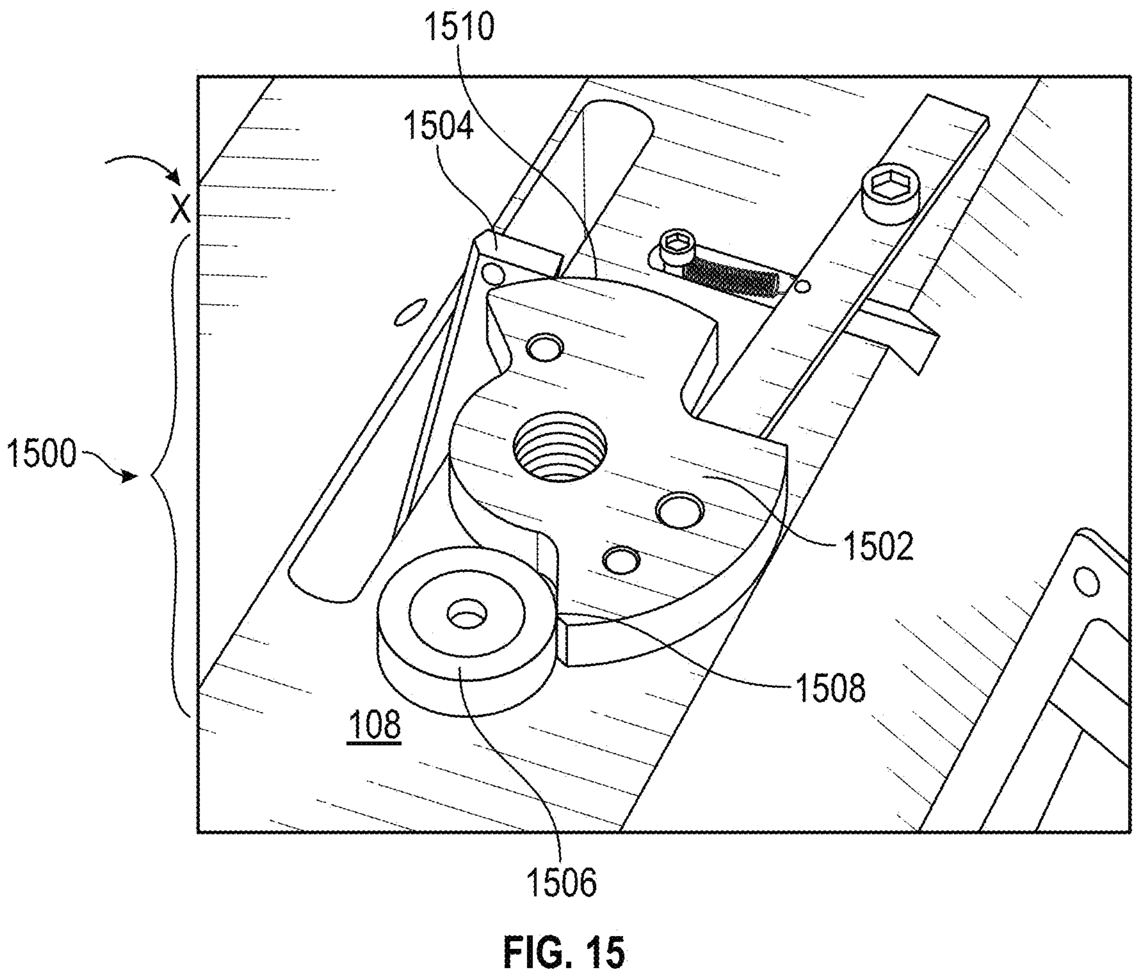
FIGS. 15-17 illustrate a deployment mechanism for the canard of FIGS. 13 and 14 integrated into the strongback assembly of FIG. 1.
Figure 16:
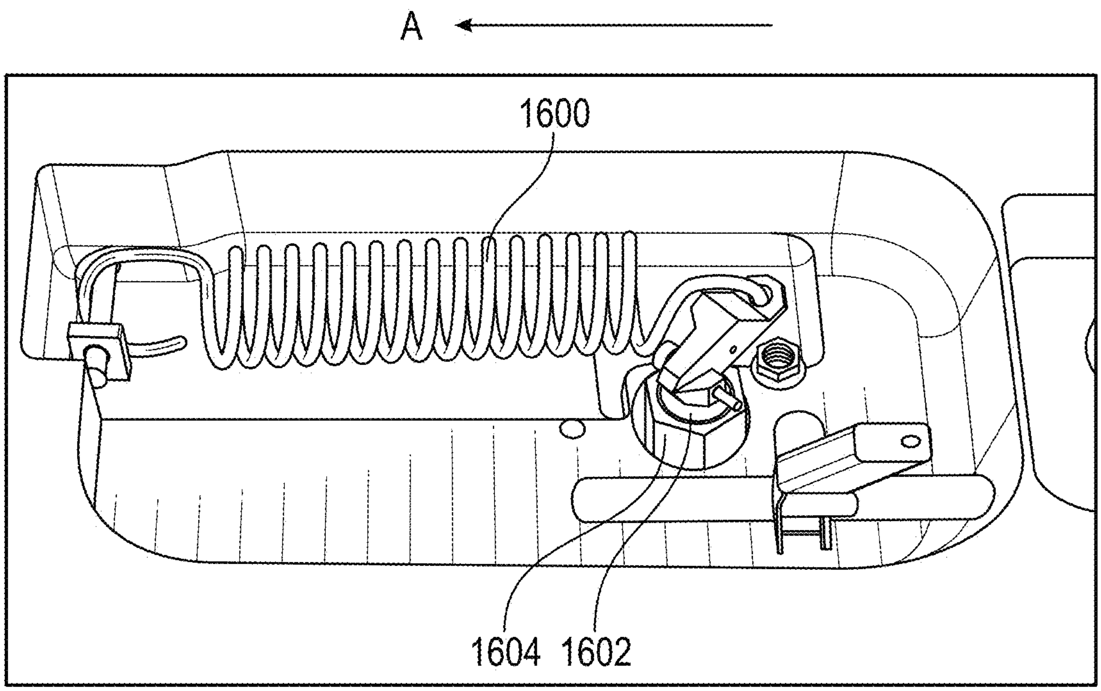

Now making reference to FIG. 15, the assembly 1500 can include a cam 1502, a lock 1504, and a biasing mechanism 1600 (FIG. 16). The assembly 1500 can also include a stop 1506. As can be seen with reference to FIG. 15, the cam 1502 can be disposed on the strongback assembly side 108. The cam 1502 can also be configured to rotate along a direction X. In FIG. 15, the assembly 1500 shows the canard 106 in the deployed configuration of FIG. 13.

Figure 13:
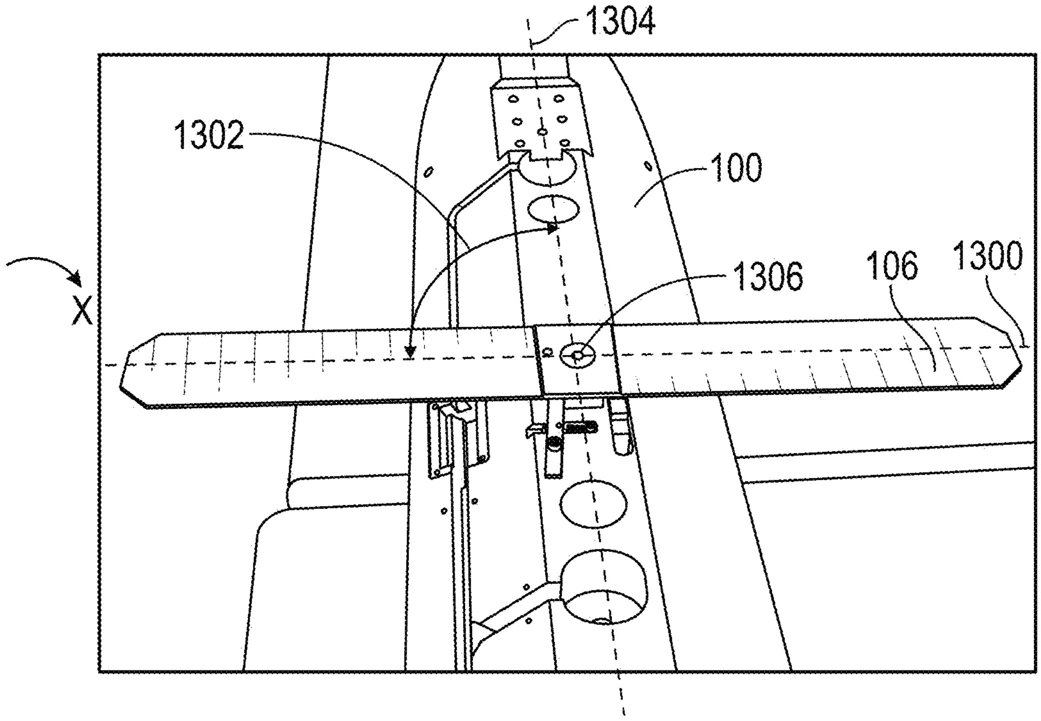
FIG. 13 shows a canard of the strongback assembly of FIG. 1 in a deployed configuration.

In the deployed configuration of FIGS. 13 and 15, the biasing mechanism 1600, which can be a tension spring, can pull the cam 1502 along a direction A. A side 1508 of the cam 1502 can abut the stop 1506. Thus, the assembly stop 1506 can limit rotation of the cam 1502 caused by the biasing mechanism 1600 when the canard 106 is in the deployed configuration. Moreover, the lock 1504 can be moved into the position shown with reference to FIG. 15 such that a side 1510 of the cam 1502 abuts the lock 1504.

The canard 106 can be rigidly coupled to the cam 1502 via fastening means 1306. The fastening means 1306 can include a bolt 1602 that is secured by a nut 1604. Alternatively, the fastening means can include a rod that extends from the canard 106 and into the assembly 1500 where the rod is frictionally fit into the canard 106 and the assembly 1500. Thus, as the cam 1502 rotates along the direction X, the canard 106 also rotates along the direction X with the cam 1502 into the deployed configuration, as shown with respect to FIG. 13.

Figure 17:
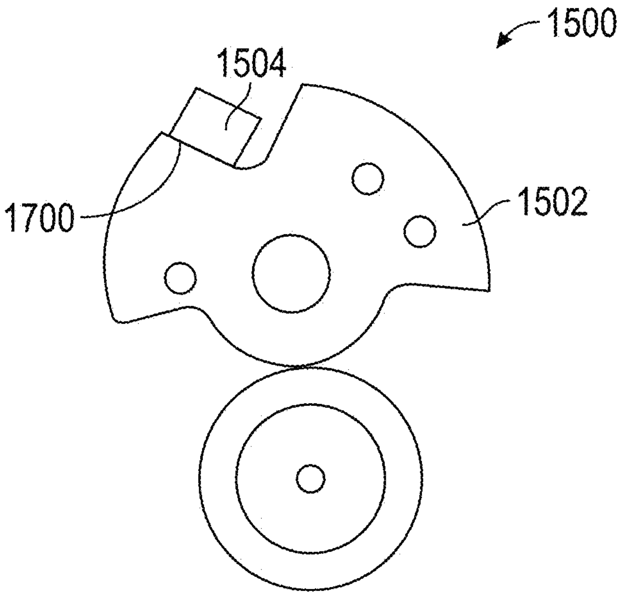

In the stowed configuration of FIG. 14, the assembly 1500 can have the configuration as shown with reference to FIG. 17. In the stowed configuration, the lock 1504 can abut a stop 1700 of the assembly 1500. As such, the lock 1504 can hold the assembly 1500 and the canard 106 in the stowed configuration via the cam stop 1700.

Figure 18:
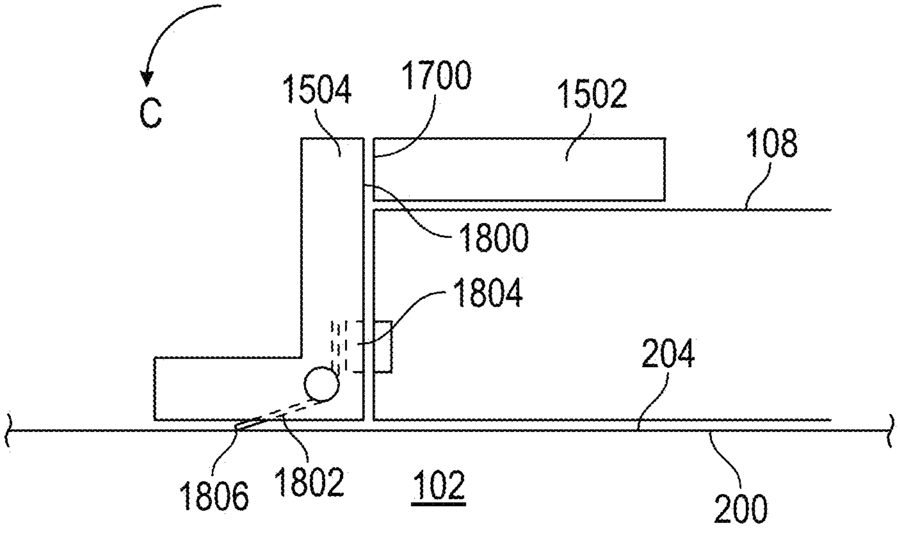
FIGS. 18-20 show a locking mechanism of the deployment mechanism of FIGS. 15-17.

Now making reference to FIG. 18, a configuration of the lock 1504 relative to the cam 1502 in a stowed configuration is shown. as can be seen with reference to FIG. 18, the lock 1504 extends between the strongback assembly side 108 and the strongback assembly 200. In the stowed configuration, a side 1800 of the lock 1504 abuts the cam stop 1700. The lock 1504 can include a biasing mechanism 1802 that abuts a stop 1804 of the biasing mechanism. In addition, an end 1806 the biasing mechanism 1802 engages with the payload side 204. In an example, the biasing mechanism 1802 biases the lock 1504 along a direction C. Moreover, the biasing mechanism can be a torsion spring.

Figure 19:
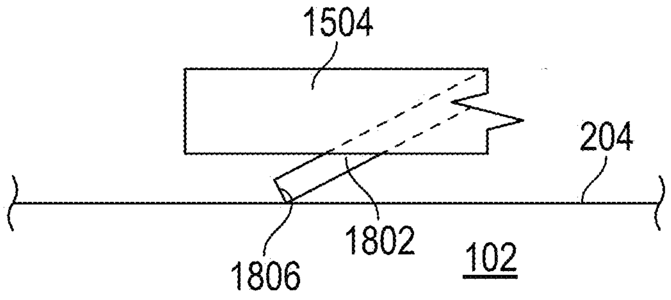

Making reference to FIG. 19, the biasing mechanism end 1806 can contact the payload side 204 when the canard 106 is in the stowed configuration. It should be noted that in FIG. 19, the lock 1504 is shown as being separated from the payload side 204. The lock 1504 is shown as being separated from the payload side 204 for explanation purposes only. More specifically, the separation between the lock 1504 and the payload side 204 is provided to show the biasing mechanism end 1806 in contact with, and engaging with, the payload side 204. The separation between the lock 1504 and the payload side 204 is also provided to show the biasing mechanism 1802 being biased against the payload side 204.

Since the lock 1504 engages with the payload side 204, the lock 1504 is held in the position shown with reference to FIGS. 17 and 18. Therefore, when the strongback assembly 100 and the payload 102 are coupled with each other, the assembly 1500 is held in the locked position as shown with reference to FIGS. 17 and 18 such that the assembly 1500 is held in the locked position by the payload 102. Furthermore, when the strongback assembly 100 and the payload 102 are coupled with each other, the canard 106 is in the stowed configuration as shown with reference to FIG. 14.

Figure 20:
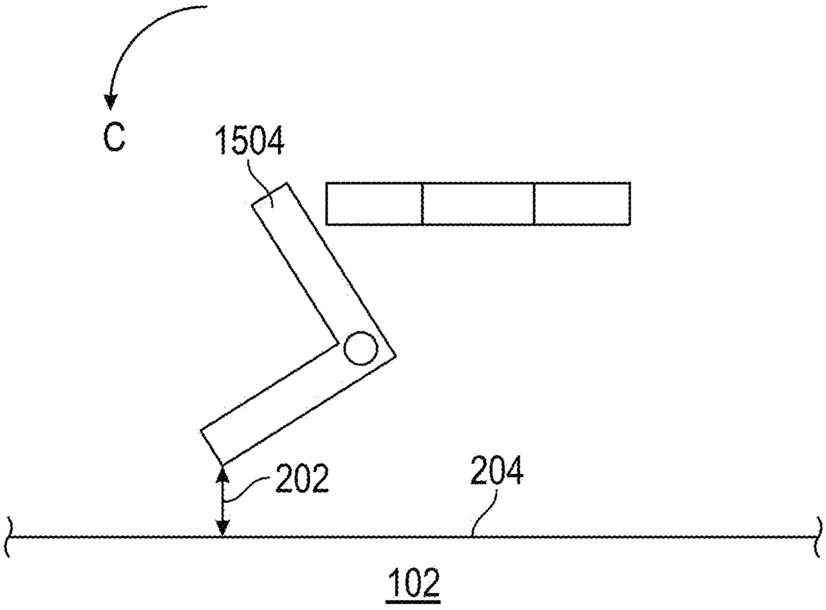

As discussed herein, the interfaces 302 and 400 along with the separation mechanism 300 function to separate the strongback assembly 100 from the payload 102 to create the gap 202. When the strongback assembly 100 separates from the payload 102, the payload side 204 no longer biases the biasing mechanism 1802. As such, the lock 1504 rotates along direction C via the biasing mechanism 1802, as shown with reference to FIG. 20. When the lock 1504 rotates along the direction C, the biasing mechanism 1600 can pull the assembly 1500 along the direction A, as shown with respect to FIG. 16. When the biasing mechanism 1600 pulls the assembly 1500, the cam 1502 rotates along the direction X as shown with respect to FIG. 15. When the cam 1502 rotates along the direction X, the canard 106 moves into the deployed configuration shown with reference to FIG. 13. Moreover, when the cam 1502 rotates along the direction X, the assembly side 1508 can abut the assembly stop 1506. Thus, the assembly stop 1506 limits the rotation of the cam 1502 along the direction X and maintains the canard 106 in the deployed configuration.

Additional Examples

Example 1 is an ejectable strongback assembly comprising: a first side configured to couple with a payload; a first canard disposed at a second side of the strongback assembly opposite the strongback assembly first side; a second canard disposed at the strongback assembly second side, wherein the first canard is disposed at first end of the strongback assembly second side and the second canard is disposed at a second end of the strongback assembly second side, the first end being opposite the second end, wherein the first canard and the second canard are both configured to generate lift forces in aerodynamic fluid about the strongback assembly to direct the strongback assembly away from the payload; a first interface and a second interface disposed at the strongback assembly first side, wherein the first interface and the second interface each are configured to: extend from the housing first side; and engage with the payload; at least one separation mechanism extending from the strongback assembly first side, the at least one separation mechanism being configured to: engage with a side of the payload; separate the strongback assembly from the payload; and electronics configured to send a control signal to the first interface and the second interface.

In Example 2, the subject matter of Example 1 includes, wherein each of the first interface and the second interface comprise low-shock explosive bolts configured to provide an initial separation distance between the strongback assembly and the payload.

In Example 3, the subject matter of Example 2 includes, wherein the first interface and the second interface are each configured to interface with lugs disposed on the payload.

In Example 4, the subject matter of Examples 2-3 includes, wherein the first interface and the second interface are each configured to interface with a threaded lug position on the payload.

In Example 5, the subject matter of Examples 2-4 includes, wherein the control signal is an electronic pulse that is configured to fire the low-shock explosive bolts.

In Example 6, the subject matter of Examples 1-5 includes, wherein the at least one separation mechanism is a compression spring and the compression spring is configured to be in a compressed state when the strongback assembly couples with the payload.

In Example 7, the subject matter of Examples 1-6 includes, wherein the at least one separation mechanism is a piston and the piston is configured to be in a withdrawn state when the strongback assembly couples with the payload.

In Example 8, the subject matter of Example 7 includes, wherein the electronics are configured to provide timing control for activation of the first interface, the second interface, and the at least one separation mechanism where the activation of the at least one separation mechanism is sequential to the activation of the first interface and the second interface.

In Example 9, the subject matter of Examples 1-8 includes, wherein the strongback assembly is configured to support a rocket motor at the second side.

In Example 10, the subject matter of Examples 1-9 includes, wherein the first interface and the second interface are configured to engage with launch lugs of the payload.

In Example 11, the subject matter of Example 10 includes, wherein the first interface and the second interface each comprise a holdback plate configured to fit within a gap of a respective launch lug.

Example 12 is a strongback assembly comprising: a first side configured to couple with a payload; a first canard disposed at a second side of the strongback assembly opposite the strongback assembly first side; a second canard disposed at the strongback assembly second side, wherein the first canard is disposed at first end of the strongback assembly second side and the second canard is disposed at a second end of the strongback assembly second side, the first end being opposite the second end, wherein the first canard and the second canard are both configured to generate lift forces in aerodynamic fluid about the strongback assembly to direct the strongback assembly away from the payload; at least one interface disposed at the strongback assembly first side, wherein the at least one interface is configured to: extend from the housing first side; and engage with the payload; at least one separation mechanism extending from the strongback assembly first side, the at least one separation mechanism being configured to: engage with a side of the payload; separate the strongback assembly from the payload; and electronics in electrical communication with the at least one interface, the electronics being configured to send a control signal to the at least one interface.

In Example 13, the subject matter of Example 12 includes, wherein the at least one interface is a first interface and the strongback assembly includes a second interface where each of the first interface and the second interface comprise low-shock explosive bolts configured to provide an initial separation distance between the strongback assembly and the payload.

In Example 14, the subject matter of Example 13 includes, wherein the control signal is an electronic pulse that is configured to fire the low-shock explosive bolts.

In Example 15, the subject matter of Examples 13-14 includes, wherein: the first interface and the second interface are configured to engage with launch lugs of the payload; and the first interface and the second interface each comprise a holdback plate configured to fit within a gap of a respective launch lug.

In Example 16, the subject matter of Examples 12-15 includes, wherein the at least one separation mechanism is a compression spring and the compression spring is configured to be in a compressed state when the strongback assembly couples with the payload.

Example 17 is an ejectable strongback assembly comprising: a first side configured to couple with a payload; a first canard disposed at a second side of the strongback assembly opposite the strongback assembly first side; a second canard disposed at the strongback assembly second side, wherein the first canard is disposed at first end of the strongback assembly second side and the second canard is disposed at a second end of the strongback assembly second side, the first end being opposite the second end, wherein the first canard and the second canard are both configured to generate lift forces in aerodynamic fluid about the strongback assembly to direct the strongback assembly away from the payload; an interface disposed at the strongback assembly first side, wherein the interface is configured to: extend from the strongback assembly first side; and engage with the payload; and at least one separation mechanism extending from the housing first side, the at least one separation mechanism being configured to: engage with a side of the payload; separate the strongback assembly from the payload.

In Example 18, the subject matter of Example 17 includes, the strongback assembly further comprising electronics in electrical communication with the interface, the electronics being configured to send a control signal to the interface.

In Example 19, the subject matter of Example 18 includes, wherein: the interface is a first interface and the strongback assembly includes a second interface where each of the first interface and the second interface comprise low-shock explosive bolts configured to provide an initial separation distance between the strongback assembly and the payload; the control signal is an electronic pulse that is configured to fire the low-shock explosive bolts; the first interface and the second interface are configured to engage with launch lugs of the payload; and the first interface and the second interface each comprise a holdback plate configured to fit within a gap of a respective launch lug.

In Example 20, the subject matter of Examples 18-19 includes, wherein the at least one separation mechanism is a compression spring and the compression spring is configured to be in a compressed state when the strongback assembly couples with the payload.

Example 21 is an apparatus comprising means to implement of any of Examples 1-20.

Example 23 is a system to implement of any of Examples 1-20.

Example 24 is a method to implement of any of Examples 1-20.

Although teachings have been described with reference to specific example teachings, it will be evident that various modifications and changes may be made to these teachings without departing from the broader spirit and scope of the teachings. Accordingly, the specification and drawings are to be regarded in an illustrative rather than a restrictive sense. The accompanying drawings that form a part hereof, show by way of illustration, and not of limitation, specific teachings in which the subject matter may be practiced. The teachings illustrated are described in sufficient detail to enable those skilled in the art to practice the teachings disclosed herein. Other teachings may be utilized and derived therefrom, such that structural and logical substitutions and changes may be made without departing from the scope of this disclosure. This Detailed Description, therefore, is not to be taken in a limiting sense, and the scope of various teachings is defined only by the appended claims, along with the full range of equivalents to which such claims are entitled.

What is claimed is:

1. An ejectable strongback assembly comprising:

a first side configured to couple with a payload;

a first canard disposed at a second side of the strongback assembly opposite the strongback assembly first side;

a second canard disposed at the strongback assembly second side, wherein the first canard is disposed at first end of the strongback assembly second side and the second canard is disposed at a second end of the strongback assembly second side, the first end being opposite the second end, wherein the first canard and the second canard are both configured to generate lift forces in aerodynamic fluid about the strongback assembly to direct the strongback assembly away from the payload;

a first interface and a second interface disposed at the strongback assembly first side, wherein the first interface and the second interface each are configured to:

extend from the housing first side; and engage with the payload;

at least one separation mechanism extending from the strongback assembly first side, the at least one separation mechanism being configured to:

engage with a side of the payload;

separate the strongback assembly from the payload; and electronics configured to send a control signal to the first interface and the second interface.

2. The ejectable strongback assembly of claim 1, wherein each of the first interface and the second interface comprise low-shock explosive bolts configured to provide an initial separation distance between the strongback assembly and the payload.

3. The ejectable strongback assembly of claim 2, wherein the first interface and the second interface are each configured to interface with lugs disposed on the payload.

4. The ejectable strongback assembly of claim 2, wherein the first interface and the second interface are each configured to interface with a threaded lug position on the payload.

5. The ejectable strongback assembly of claim 2, wherein the control signal is an electronic pulse that is configured to fire the low-shock explosive bolts.

6. The ejectable strongback assembly of claim 1, wherein the at least one separation mechanism is a compression spring and the compression spring is configured to be in a compressed state when the strongback assembly couples with the payload.

7. The ejectable strongback assembly of claim 1, wherein the at least one separation mechanism is a piston and the piston is configured to be in a withdrawn state when the strongback assembly couples with the payload.

8. The ejectable strongback assembly of claim 7, wherein the electronics are configured to provide timing control for activation of the first interface, the second interface, and the at least one separation mechanism where the activation of the at least one separation mechanism is sequential to the activation of the first interface and the second interface.

9. The ejectable strongback assembly of claim 1, wherein the strongback assembly is configured to support a rocket motor at the second side.

10. The ejectable strongback assembly of claim 1, wherein the first interface and the second interface are configured to engage with launch lugs of the payload.

11. The ejectable strongback assembly of claim 10, wherein the first interface and the second interface each comprise a holdback plate configured to fit within a gap of a respective launch lug.

12. An ejectable strongback assembly comprising:

a first side configured to couple with a payload;

a first canard disposed at a second side of the strongback assembly opposite the strongback assembly first side;

a second canard disposed at the strongback assembly second side, wherein the first canard is disposed at first end of the strongback assembly second side and the second canard is disposed at a second end of the strongback assembly second side, the first end being opposite the second end, wherein the first canard and the second canard are both configured to generate lift forces in aerodynamic fluid about the strongback assembly to direct the strongback assembly away from the payload;

at least one interface disposed at the strongback assembly first side, wherein the at least one interface is configured to:

extend from the housing first side; and engage with the payload;

at least one separation mechanism extending from the strongback assembly first side, the at least one separation mechanism being configured to:

engage with a side of the payload;

separate the strongback assembly from the payload; and electronics in electrical communication with the at least one interface, the electronics being configured to send a control signal to the at least one interface.

13. The ejectable strongback assembly of claim 12, wherein the at least one interface is a first interface and the strongback assembly includes a second interface where each of the first interface and the second interface comprise low-shock explosive bolts configured to provide an initial separation distance between the strongback assembly and the payload.

14. The ejectable strongback assembly of claim 13, wherein the control signal is an electronic pulse that is configured to fire the low-shock explosive bolts.

15. The ejectable strongback assembly of claim 13, wherein:

the first interface and the second interface are configured to engage with launch lugs of the payload; and the first interface and the second interface each comprise a holdback plate configured to fit within a gap of a respective launch lug.

16. The ejectable strongback assembly of claim 12, wherein the at least one separation mechanism is a compression spring and the compression spring is configured to be in a compressed state when the strongback assembly couples with the payload.

17. An ejectable strongback assembly comprising:

a first side configured to couple with a payload;

a first canard disposed at a second side of the strongback assembly opposite the strongback assembly first side;

a second canard disposed at the strongback assembly second side, wherein the first canard is disposed at first end of the strongback assembly second side and the second canard is disposed at a second end of the strongback assembly second side, the first end being opposite the second end, wherein the first canard and the second canard are both configured to generate lift forces in aerodynamic fluid about the strongback assembly to direct the strongback assembly away from the payload;

an interface disposed at the strongback assembly first side, wherein the interface is configured to:

extend from the strongback assembly first side; and engage with the payload; and at least one separation mechanism extending from the housing first side, the at least one separation mechanism being configured to:

engage with a side of the payload;

separate the strongback assembly from the payload.

18. The ejectable strongback assembly of claim 17, the strongback assembly further comprising electronics in electrical communication with the interface, the electronics being configured to send a control signal to the interface.

19. The ejectable strongback assembly of claim 18, wherein:

the interface is a first interface and the strongback assembly includes a second interface where each of the first interface and the second interface comprise low-shock explosive bolts configured to provide an initial separation distance between the strongback assembly and the payload;

the control signal is an electronic pulse that is configured to fire the low-shock explosive bolts;

the first interface and the second interface are configured to engage with launch lugs of the payload; and the first interface and the second interface each comprise a holdback plate configured to fit within a gap of a respective launch lug.

20. The ejectable strongback assembly of claim 18, wherein the at least one separation mechanism is a compression spring and the compression spring is configured to be in a compressed state when the strongback assembly couples with the payload.

* * * * *